April 11, 1967

W. E. REIMER 3,313,555

VEHICLE SUSPENSION SYSTEM

Filed July 20, 1964

INVENTOR.
Walter E. Reimer
BY
Webster & Webster
ATTYS.

April 11, 1967 W. E. REIMER 3,313,555
VEHICLE SUSPENSION SYSTEM
Filed July 20, 1964 3 Sheets-Sheet 2
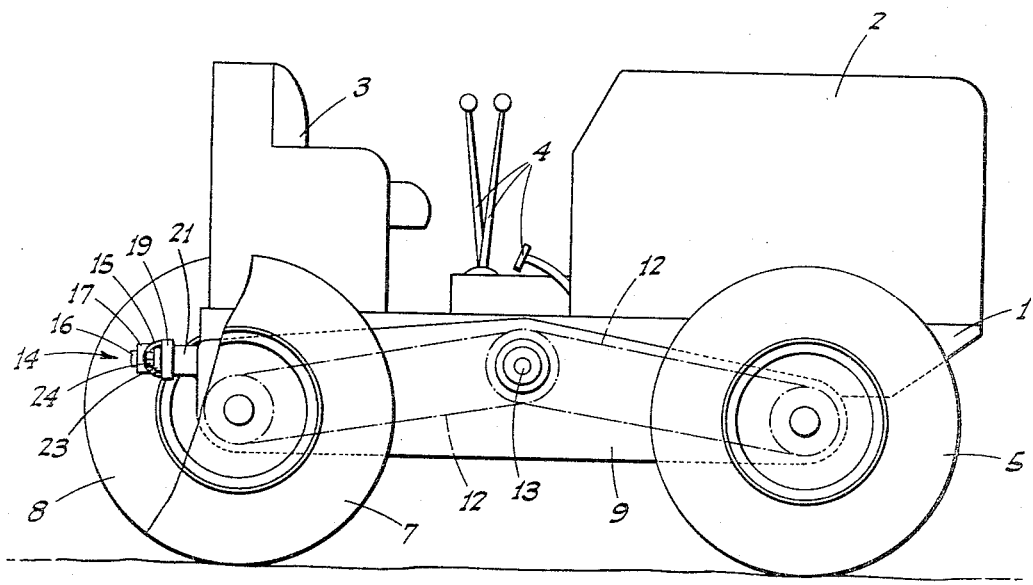
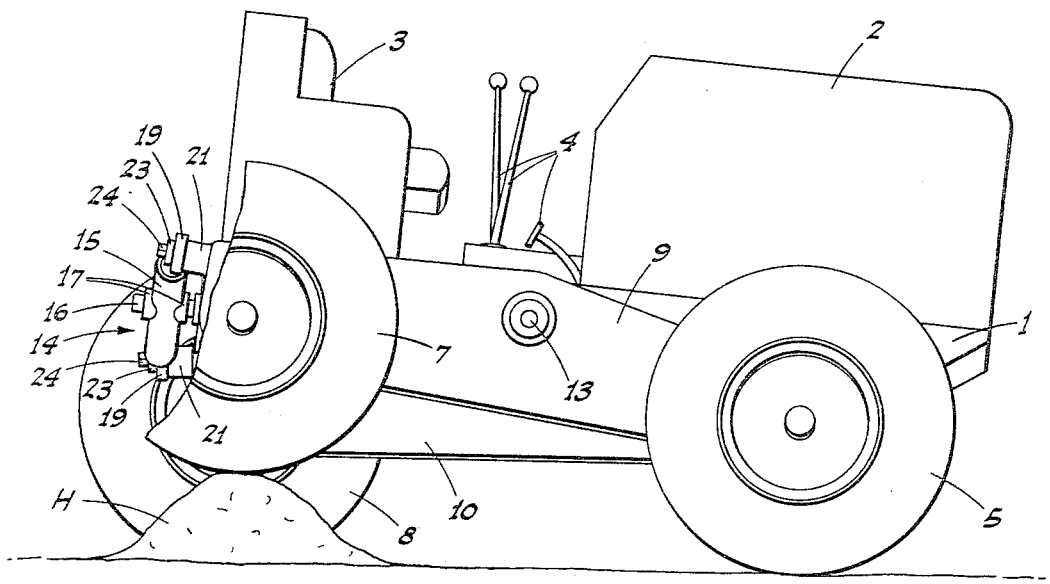

April 11, 1967 W. E. REIMER 3,313,555
VEHICLE SUSPENSION SYSTEM
Filed July 20, 1964 3 Sheets-Sheet 3

United States Patent Office 3,313,555
Patented Apr. 11, 1967

3,313,555
VEHICLE SUSPENSION SYSTEM
Walter E. Reimer, 16201 Ridgecrest Ave.,
Monte Sereno, Calif. 95030
Filed July 20, 1964, Ser. No. 383,636
1 Claim. (Cl. 280—104)

The present invention is directed to and it is a major object to provide a novel suspension system for a self-propelled four wheel drive vehicle identified hereinafter as a tractor; the above suspension system being especially designed, but not limited, for use in connection with off-the-road tractors which must frequently travel over uneven or rough terrain.

An additional important object of this invention is to provide a novel suspension system for a four wheel tractor wherein the wheels are mounted and arranged for relative vertical movement in a manner which, firstly, assures of such wheels each bearing a substantially equal load regardless of their position resultant from the surface being traversed and, secondly, substantially reduces the lateral tilting of the tractor upon a wheel riding over a hump or dropping into a depression.

Another important object of the invention is to provide a suspension system, as above, which includes—in novel combination—a longitudinally extending rocking beam transversely pivotally mounted centrally of its ends on each side of the tractor, each rocking beam having the corresponding front and rear wheels journaled thereon, and a transversely extending motion transmitting cross bar unit spanning between and connected to the rocking beams at one end thereof; such cross bar unit being longitudinally pivotally mounted centrally of its ends whereby vertical motion of one such wheel carrying rocking beam produces a responsive and compensating motion of the other wheel carrying rocking beam.

Still another important object of the invention is to provide a motion transmitting cross bar, as in the preceding paragraph, designed and constructed to prevent the occurrence of undue stresses, twisting, strains, or binding in the structural assembly of the suspension system.

It is also an object of the invention to provide a suspension system which is of particular advantage in a tractor of four wheel drive type; this for the reason that such suspension system improves the traction of all the wheels on the surface being traversed.

Additionally, it is an object of the invention to provide a suspension system which is particularly well adapted for inclusion in the tractor of industrial, commercial, and earth moving equipment of sundry types, as well as in compact vehicles of the "Jeep" type.

A further object of the invention is to provide a vehicle suspension system which is designed for ease and economy of manufacture.

A still further object of the invention is to provide a practical, reliable, and durable vehicle suspension system and one which is exceedingly effective for the purpose for which it is designed.

These objects are accomplished by means of such structure and relative arrangement of parts as will fully appear by a perusual of the following specification and claim.

In the drawings:

FIG. 2 is a side elevation of the above tractor with the wheels all resting on a substantially level surface; the near rear wheel being partly broken away.

FIG. 3 is a similar view but shows the near rear wheel as traversing a hump and, consequently, in a raised position; the view additionally showing the positions then occupied by certain parts of the suspension system.

Figure 1:
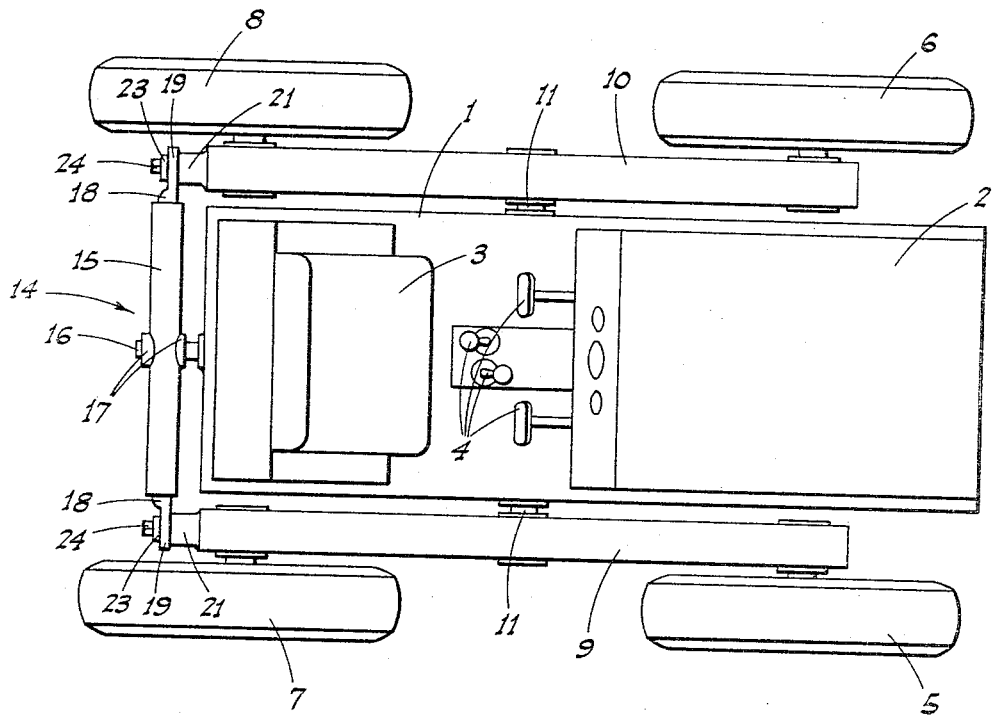
FIG. 1 is a top plan view of a four wheel drive tractor embodying the suspension system of the present invention; the tractor being shown substantially diagrammatically.
Figure 6:
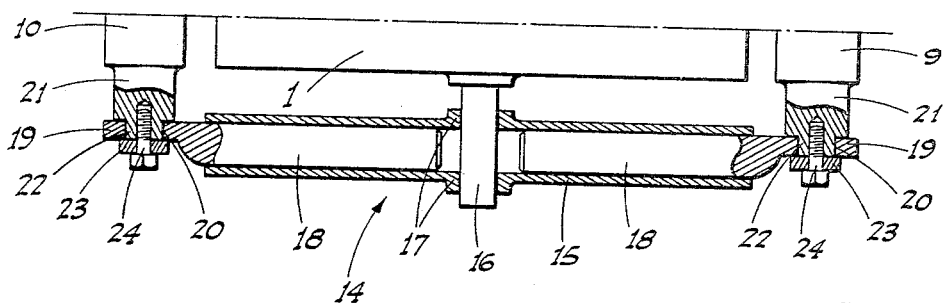
Figure 4:
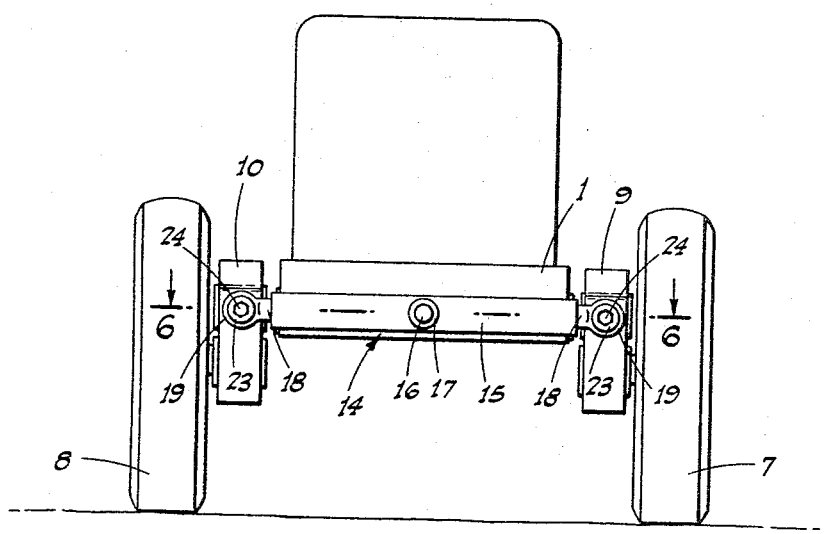
Figure 5:
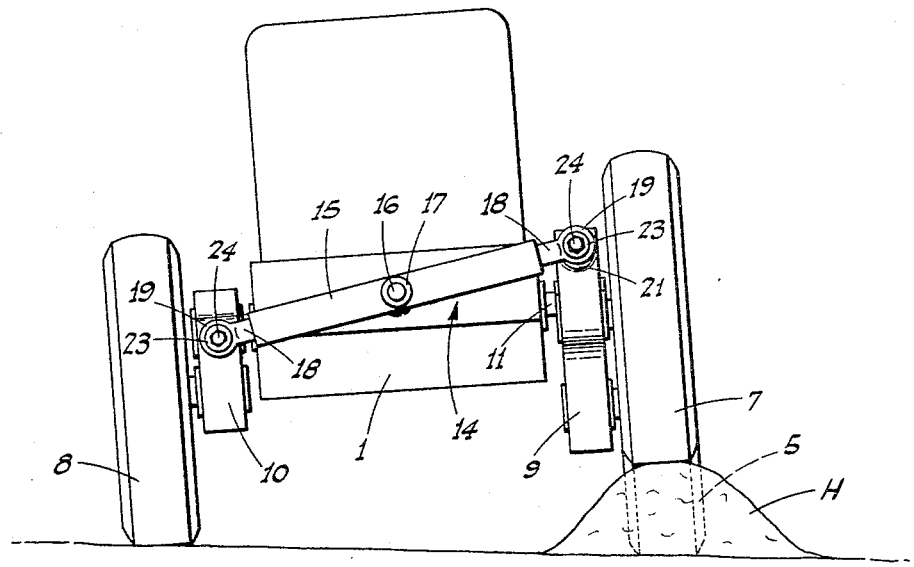

FIG. 4 is a rear end elevation corresponding to FIG. 2.
FIG. 5 is a rear end elevation corresponding to FIG. 3.
FIG. 6 is a fragmentary plan view, mainly in section, taken on substantially line 6—6 of FIG. 4.

Referring now more particularly to the drawings and to the characters of reference marked thereon, the suspension system is here shown as embodied in connection with a tractor which includes a body 1, an engine 2, an operator's seat 3 rearwardly of the engine, and the usual controls 4.

Additionally, the tractor includes four rubber tired wheels; viz, a right front wheel 5, a left front wheel 6, a right rear wheel 7, and a left rear wheel 8. All of such wheels are power driven in the manner hereinafter described.

The suspension system of the present invention comprises the following:

A heavy duty longitudinal rocking beam extends along each side of the tractor; the right-hand rocking beam being indicated at 9 and the left-hand rocking beam being indicated at 10. Each of such rocking beams is transversely pivotally mounted centrally of its ends on a laterally projecting trunnion 11 fixed in connection with the adjacent side of the tractor body 1. As so mounted, each of the rocking beams 9 and 10 is capable of swinging motion in a longitudinal substantially vertical plane.

The trunnions 11 are disposed intermediate the ends of the body 1 and in transverse alignment; the rocking beams 9 and 10 being of such length that their front ends terminate short of the corresponding end of the tractor body 1, while the rear ends of said rocking beams extend slightly beyond the back of such tractor body.

Each of the rocking beams has the corresponding front and rear wheels journaled thereon; the wheels 5 and 7 on the right-hand side of the vehicle being journaled on the rocking beam 9, while the wheels 6 and 8 on the left-hand side of the vehicle are journaled on the rocking beam 10.

The front and rear wheels on each side of the vehicle are individually driven by a corresponding endless drive unit, indicated generally at 12; each such drive unit (which may be of conventional chain and sprocket type) runs between a drive shaft 13 and the related wheel. The drive shafts 13 are concentric to the related trunnions 11, and preferably are housed within the rocking beams 9 and 10.

A motion transmitting cross bar unit, indicated generally at 14, is disposed adjacent but rearwardly of the body 1 and spans between the rear ends of the rocking beams 9 and 10; such cross bar unit 14 being constructed more particularly as follows:

A tubular cross bar 15 is longitudinally pivotally mounted centrally of its ends on a rearwardly projecting trunnion 16 fixed on the body 1 at the rear thereof and equidistant of the sides; such trunnion 16 being relatively longitudinally slidably journaled in the cross bar 15, as at 17, and the cross bar unit 14 being swingable about trunnion 16 in a transverse, substantially vertical plane.

Each end portion of the tubular cross bar 15 receives—in slidable and rotatable rotation—a heavy duty rod 18, and which rod is telescoped a substantial distance into the cross bar 15 but terminates short of the trunnion 16.

At the outer end thereof, each rod 18 is formed with a transversely extending substantially horizontally facing ear 19 formed with a circular opening 20. At the rear end each rocking beam includes a rearwardly projecting boss 21 formed with a reduced diameter neck 22; each such neck projecting into the circular opening 20 of the corresponding ear 19. Escape of each neck 22 from the corresponding ear 19 is prevented by a neck-abutting washer 23 having a bolt 24 projecting therethrough and thence threaded into said neck 22.

With the above arrangement, each rod 18 is attached at its outer end to the corresponding end of the related rocking beam, with the ear 19 relatively turnable about the engaged neck 22. In other words, the motion transmitting cross bar unit 14 is connected at its ends to the rear ends of the rocking beams 9 and 10 for relative motion about longitudinal axes. Also, the motion transmitting cross bar unit 14 is, in effect, extensible at its ends by reason of the rods 18 being slidable in the tubular cross bar 15; the turnability of the rods 18 in said tubular cross bar 15 preventing undue twisting strains on said bar.

Upon a tractor—embodying the described suspension system—traversing an uneven surface, the following is an example of the functioning of such system:

Upon the right rear wheel 7 riding up onto a hump H, the right-hand rocking beam 9 is raised at its rear end and which through the instrumentality of the motion transmitting cross bar unit 14 causes lowering of the rear end of the left-hand rocking beam 10 and, of course, the left rear wheel 8. At the same time, the front end of the right-hand rocking beam 9 lowers with the right front wheel 5 and the front end of the left-hand rocking beam 10 rises with the left front wheel 6.

Thus, with such movements of the rocking beams and wheels (all relative to the body 1), vertical motion—either up or down—of a wheel of the tractor produces a compensating effect on the remaining wheels with respect to their relative vertical positions, while all of the wheels continue under effective traction and bear substantially equal load.

It is to be recognized that by reason of the extensibility of the motion transmitting cross bar unit 14 at its ends, and the toggle-like connection between such unit and the rocking beams 9 and 10, the latter are free to play up and down without any binding at such connections or undue stresses or strains being applied to said rocking beams as the distance between the trunnion 16 and the necks 22 varies with motion of said rocking beams about the trunnions 11. This result is also enhanced by reason of the fact that the cross bar 15 is longitudinally slidably journaled, as at 17, on the trunnion 16, whereby the motion transmitting cross bar unit 14 can move back and forth on said trunnion 16.

The compensating effect obtained from one side to the other of the tractor and through the medium of the described suspension system not only is advantageous with respect to the maintenance of traction and the distribution of load, but also the lateral tilting or canting of the tractor body is materially reduced as a wheel on one side or the other rises on a hump on, or drops into a hole in, the surface being traversed.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

I claim:

A suspension system, for a vehicle having a body and transversely spaced front and rear wheels, comprising a longitudinal rocking beam extending along each side of the body, corresponding front and rear wheels being journaled on the related ends of each rocking beam, means pivotally mounting each rocking beam centrally of its ends on the body for motion about a transverse axis, a motion transmitting cross bar unit spanning between the rocking beams at one end thereof, means pivotally mounting the cross bar unit centrally of its ends on the body for motion about a longitudinal axis, the cross bar unit including extensible end portions, and means pivotally connecting each of said end portions to the adjacent end of the corresponding rocking beam; said unit including a tubular cross bar, and said extensible end portions being elements in part slidably and turnably engaged in such cross bar; said pivotal connecting means for such extensible end portions being a transversely projecting ear on the outer end of each thereof, the ear having a longitudinal axis opening therethrough, and a longitudinal neck on the corresponding rocking beam turnably secured in said ear.

References Cited by the Examiner

UNITED STATES PATENTS 3,266,815   8/1966   Bishop _____ 280—104

BENJAMIN HERSH, *Primary Examiner.*

P. GOODMAN, *Assistant Examiner.*